(12) United States Patent
Gushiken (10) Patent No.: US 6,630,908 B2
(45) Date of Patent: Oct. 7, 2003

(54) RADIO COMMUNICATIONS MODULE HAVING A TEST TERMINAL TO WHICH A TEST PROBE CAN BE CONNECTED, AND ELECTRONIC APPARATUS COMPRISING A RADIO COMMUNICATIONS MODULE

(75) Inventor: Hajime Gushiken, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 10/083,392

(22) Filed: Feb. 27, 2002

(65) Prior Publication Data

US 2002/0118136 A1 Aug. 29, 2002

(30) Foreign Application Priority Data

Feb. 28, 2001 (JP) .................................... 2001-055212

(51) Int. Cl.[7] .................................. H01Q 1/24
(52) U.S. Cl. ..................... 343/702; 343/906
(58) Field of Search ................. 343/702, 906; 455/90

(56) References Cited

U.S. PATENT DOCUMENTS

| | | | | |
|---|---|---|---|---|
| 5,918,163 A | * | 6/1999 | Rossi | 455/90 |
| 6,031,497 A | * | 2/2000 | Nam | 343/702 |
| 6,181,284 B1 | * | 1/2001 | Madsen et al. | 343/702 |
| 6,359,591 B1 | * | 3/2002 | Mou | 343/702 |
| 6,377,218 B1 | * | 4/2002 | Nelson et al. | 343/702 |
| 6,538,606 B2 | * | 3/2003 | Quinn et al. | 343/702 |

* cited by examiner

Primary Examiner—Don Wong
Assistant Examiner—Shih-Chao Chen
(74) Attorney, Agent, or Firm—Finnegan, Henderson, Farabow, Garrett & Dunner, L.L.P.

(57) ABSTRACT

A radio communications module has a circuit board that processes radio signals. The circuit board has a first surface and a second surface opposite to the first surface. The first surface opposes a system board. A connector is arranged on the first surface. The connector can be electrically connected to the system board. An antenna connector and a test terminal are provided on the second surface. An antenna cable can be connected to the antenna connector. A test probe can be removably connected to the test terminal.

15 Claims, 9 Drawing Sheets

RADIO COMMUNICATIONS MODULE HAVING A TEST TERMINAL TO WHICH A TEST PROBE CAN BE CONNECTED, AND ELECTRONIC APPARATUS COMPRISING A RADIO COMMUNICATIONS MODULE

CROSS-REFERENCE TO RELATED APPLICATIONS

This application is based upon and claims the benefit of priority from the prior Japanese Patent Application No. 2001-055212, filed Feb. 28, 2001, the entire contents of which are incorporated herein by reference.

BACKGROUND OF THE INVENTION

1. Field of the Invention

The present invention relates to a radio communications module to be mounted on a system board. The invention also relates to an electronic apparatus, such as a portable computer or a portable information tool, which incorporates the radio communications module.

2. Description of the Related Art

Recently, various electronic apparatuses, each incorporating a radio communications module such as Bluetooth (trademark) or wireless LAN, have become available. An electronic apparatus of this type comprises a housing that contains the radio communications module. The housing incorporates a system board. The system board has a mounting region, on which the first interface connector is mounted.

The radio communications module comprises a circuit board that can process radio signals. The circuit board has a connector surface that opposes the mounting region of the system board. On the connector surface, the second interface connector and an antenna connector are provided. The second interface connector is coupled to the first interface connector. The first and second connectors connect the radio communications module to the system board. The antenna connector is electrically connected to the RF circuit provided on the circuit board. An antenna cable connects the antenna connector to an antenna element. The node of the antenna connector and the antenna cable lies between the circuit board and the system board.

To determine the RF characteristics of the radio communications module, the module must be electrically connected to the system board. To this end, the antenna cable is removed from the antenna connector, and then the antenna connector is electrically disconnected from the RF circuit on the circuit board, and finally the test probe is connected to the antenna connector. After the RF characteristics of the module are determined, the antenna cable must be connected to the antenna connector.

The antenna connector opposes the mounting region of the system board, spaced a very short distance from the system board. Therefore, the antenna cable cannot be removed from the antenna connector unless the radio communications module is disconnected from the system board. Nor can the test probe contact the antenna connector if the module is disconnected from the system board. To determine the RF characteristics of the radio communications module, it is necessary to decompose the housing and, then, remove the module from the system board.

Obviously, it takes much time and labor to determine the RF characteristics of the radio communications module. The RF characteristics of the module cannot be determined with high efficiency.

BRIEF SUMMARY OF THE INVENTION

A first object of the present invention is to provide a radio communications module that can be electrically tested by using a test probe, both reliably and efficiently.

A second object of the invention is to provide an electronic apparatus that incorporates a radio communications module of the type mentioned above.

To achieve the first object, a radio communications module according to a first aspect of the invention comprises: a circuit board which processes radio signals and which has a first surface and a second surface opposite to the first surface, the first surface opposing a system board;

a connection section which is arranged on the first surface of the circuit board and which is to be electrically connected to the system board;

an antenna connector which is arranged on the second surface of the circuit board and to which an antenna cable extending from an antenna element for achieving radio communication is to be electrically connected; and a test terminal which is arranged on the second surface of the circuit board so as to measure a characteristic of the circuit board.

The test terminal faces away from the system board while the circuit board remains electrically connected to the system board. The test terminal would not lie between the circuit board and the system board. A test probe can therefore be brought into contact with the test terminal, without removing the circuit board from the system board. This makes it easy to determine the electrical properties of the radio communications module.

To attain the second object, an electronic apparatus according to a second aspect of the invention comprises: a housing which has an outer wall having a through hole; a system board which is incorporated in the housing and which has a mounting surface that opposes the outer wall; and a radio communications module which is mounted on the mounting surface of the system board. The module includes: a circuit board which processes radio signals and which has a first surface and a second surface, the first surface opposing the mounting surface, and the second surface being opposite to the first surface and opposing the outer wall; a connection section which is arranged on the first surface of the circuit board and which is to be electrically connected to the system board; an antenna connector which is arranged on one of the first surface and second surface of the circuit board and to which an antenna cable extending from an antenna element for achieving radio communication is to be electrically connected; and a test terminal which is arranged on the second surface of the circuit board, which is aligned with the through hole of the outer wall and to which a test probe inserted into the housing via the through hole is to be connected removably.

In the electronic apparatus, the test terminal faces away from the system board while the circuit board remains electrically connected to the system board. The test terminal would not lie between the circuit board and the system board. Additionally, the test probe can contact the test terminal when it is inserted into the housing via the through hole, because the test terminal is aligned with the through hole made in the outer wall.

Hence, the electrical characteristics of the radio communications module can be determined, without removing the module from the system board or decomposing the housing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A portable computer according to the first embodiment of the invention will be described, with reference to FIGS. 1 to 3, FIGS. 4A to 4E, FIGS. 5 and 6 and FIGS. 7A and 7B.

Figure 1:
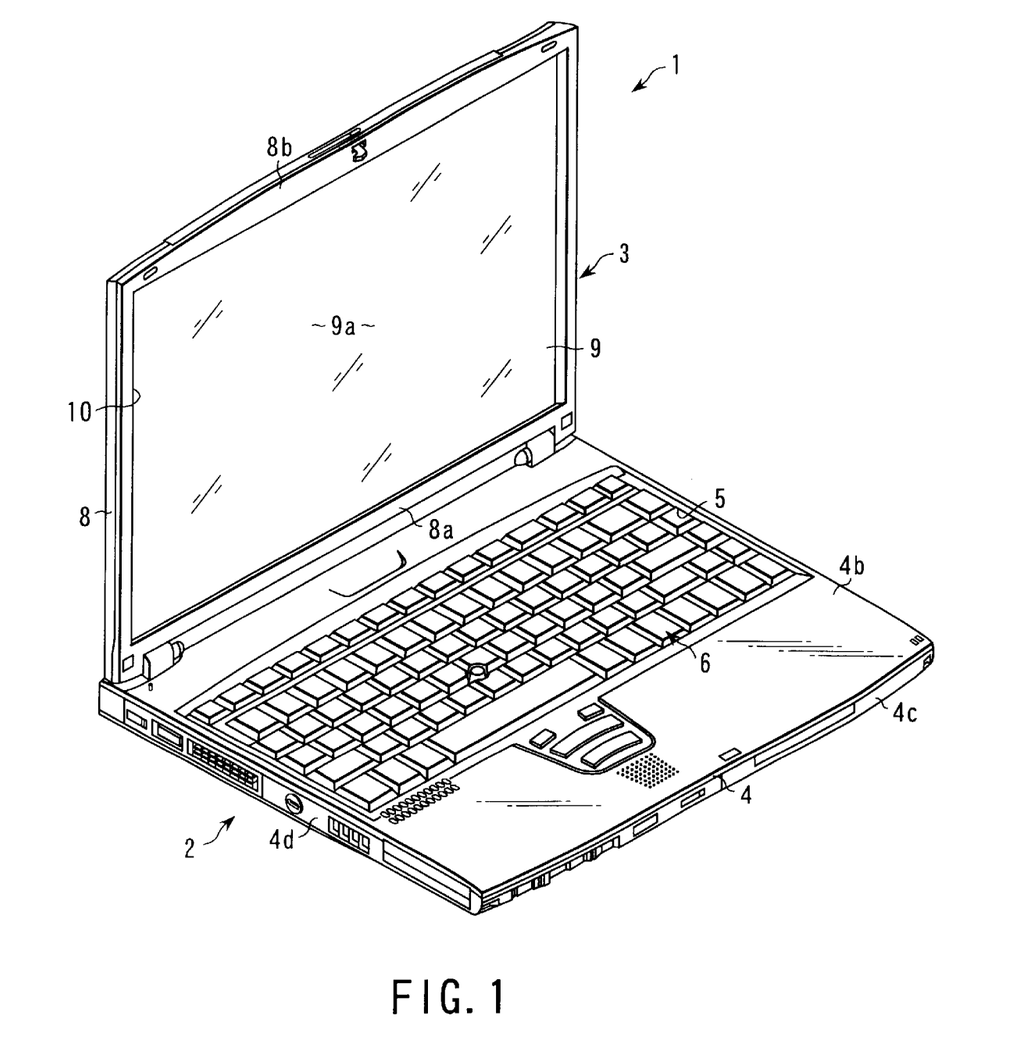
FIG. 1 is a perspective view of a portable computer according the first embodiment of this invention.
Figure 2:
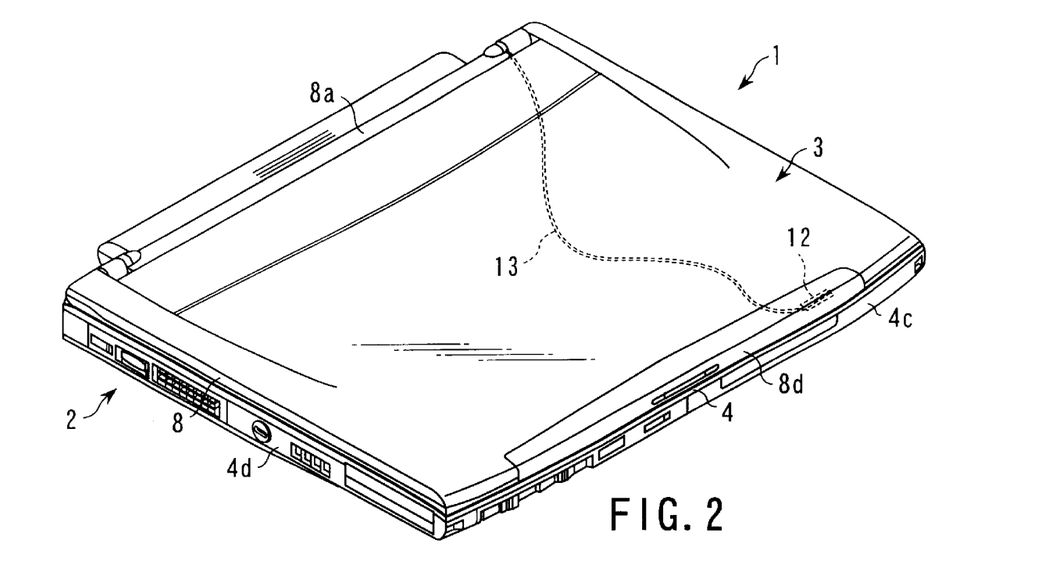
FIG. 2 is a perspective view of the portable computer, showing the positional relation between an antenna element and the display housing.
Figure 3:
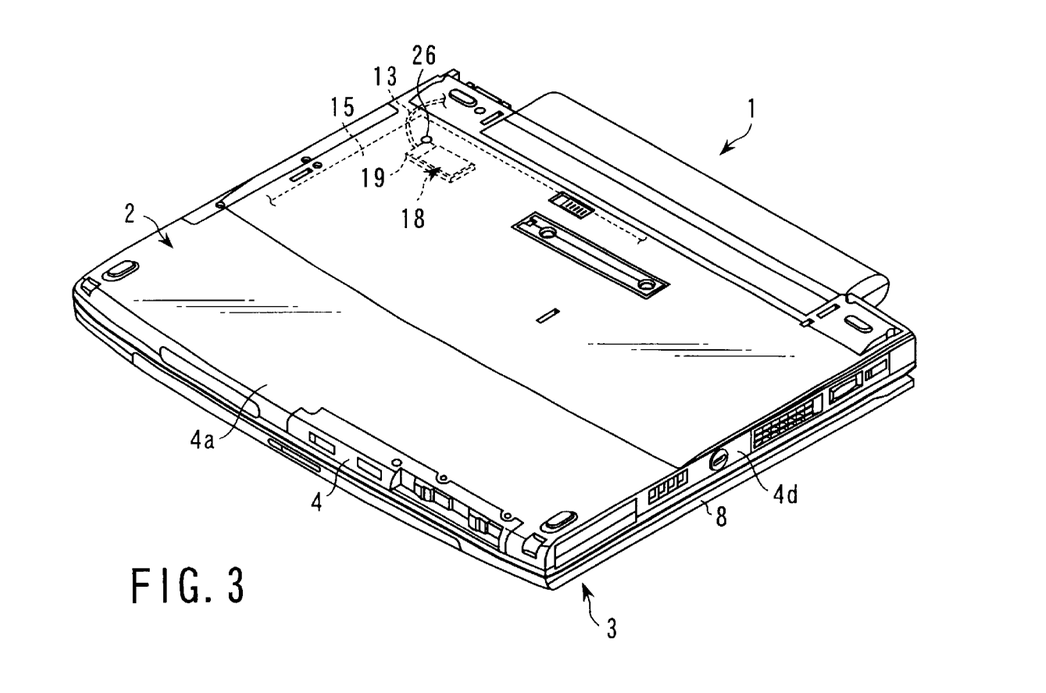
FIG. 3 is a perspective view of the portable computer, illustrating the positional relation between the housing and the radio communications module.

FIGS. 1 to 3 shows the portable computer 1, or an electronic apparatus according to the present invention. The portable computer 1 comprises a main unit 2 and a display unit 3. The main unit 2 has a housing 4, which is shaped like a flat box. The housing 4 comprises six outer walls, i.e., a bottom wall 4a, a top wall 4b, a front wall 4c, left and right walls 4d, and a rear wall (not shown). The top wall 4b has a keyboard-holding opening 5, in which a keyboard 6 is fitted.

The display unit 3 comprises a display housing 8 and a liquid crystal display 9. The display 9 is incorporated in the display housing 8. The display housing 8 is shaped like a flat box. The liquid crystal display 8 has a display screen 9a that can display information, such as text data and image data. The display screen 9a is exposed through an opening 10 made in the display housing 8.

The display housing 8 has two end edge 8a and 8b. The first edge part 8a lies at the rear edge of the housing 4. The second edge part 8b opposes the first edge part 8a, across the display screen 9a. The first edge part 8a is coupled to the rear edge of the housing 4 by means of a hinge device (not shown). The display unit 3 can therefore rotate between a closed position and an opened position. At the closed position, the display unit 3 lies on the housing 4, covering the keyboard 6 and the top wall 4b from above. At the opened position, the display unit 3 stands up, exposing the keyboard 6 and the display screen 9a.

As FIG. 2 shows, the display unit 3 incorporates an antenna element 12 for use in combination with, for example, Bluetooth (trademark) that is a radio communications module. The antenna element 12 lies in the second edge part 8b of the display housing 8. Therefore, the antenna element 12 is at the longest distance from the main unit 2 once the display unit 3 has been rotated to the opened position.

The antenna element 12 is connected to one end of an antenna cable 13. The antenna cable 13 is, for example, a coaxial cable. The cable 13 extends from the first edge part 8a of the display housing 8 into the housing 4. In the housing 4, the other end of the antenna cable 13 is connected to a connection terminal 14, which is illustrated in FIG. 5.

Figure 5:
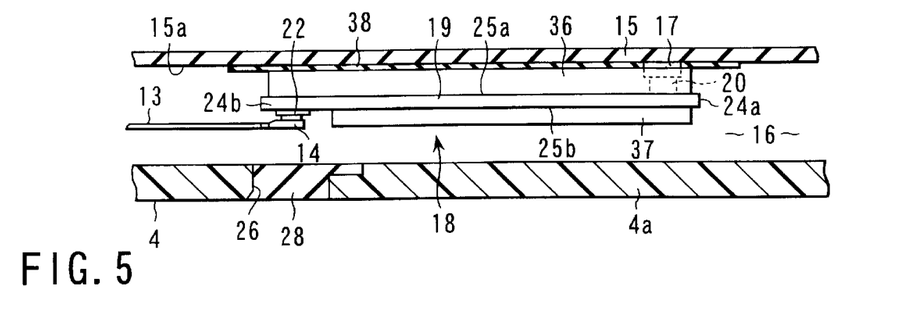
FIG. 5 is a sectional view of the portable computer, showing the positional relation between the bottom wall of the housing and the radio communications module mounted on the system board.

As seen from FIGS. 3 and 5, the housing 4 contains a system board 15. The system board 15 expends parallel to the bottom wall 4a of the housing 4. The board 15 has a mounting region 15a that opposes the bottom wall 4a and spaced therefrom. A space 16 is provided between the bottom wall 4a and the mounting region 15a of the system board 15. A connector receptacle 17 is mounted on the mounting region 15a. The receptacle 17 is electrically connected to the system board 15 and exposed to the space 16 provided in the housing 4.

The space 16 accommodates a radio communications module 18 such as Bluetooth (trademark). As FIGS. 4A to 4E show, the radio communications module 18 comprises a circuit board 19, an interface connector 20, an antenna connector 21, and a test terminal 22. The interface connector 20 serves as a connecting section.

The circuit board 19 constitutes an RF circuit 23. The RF circuit 23 is a high-frequency circuit that accomplishes radio communication. The circuit 23 is electrically connected to the controller LSI that is provided on the circuit board 19.

The circuit board 19 is a rectangular plate. The board 19 has two edge parts 24a and 24b, which are spaced apart in the lengthwise direction of the circuit board 19. The circuit board 19 has a first surface 25a and a second surface 25b opposite to the first surface 25a. The first surface 25a faces the system board 16. The second surface 25b opposes the bottom wall 4a of the housing 4.

The interface connector 20 is mounted on the first surface 25a of the circuit board 19 and positioned at the first edge part 24a of the circuit board 19. The connector 20 is connected to the connector receptacle 17 of the system board 15. Thus, the radio communications module 18 is electrically connected to the system board 15.

The antenna connector 21 is mounted on the second surface 25b of the circuit board 19 and located at the second edge part 24b of the circuit board 19. The antenna connector 21 faces the bottom wall 4a of the housing 4. The connection terminal 14 of the antenna cable 13 is electrically connected to the antenna connector 21.

The test terminal 22 is mounted on the second surface 25b of the circuit board 19 and located at the second edge part 24b of the circuit board 19. The test terminal 22 and the antenna connector 21 are, therefore, spaced apart from the interface connector 20, across the circuit board 19. The test terminal 22 opposes the bottom wall 4a of the housing 4. The bottom wall 4a has a through hole 26. Through the hole 26 a test probe 27 can be inserted into the housing 4 to determine the RF characteristics of the radio communications module 18. The hole 26 is aligned with the test terminal 22 and is usually closed by a removable plug 28.

The antenna connector 21 and the test terminal 22 are arranged side by side on the second surface 25b of the circuit board 19. The antenna connector 21 has a contact 30 that contacts the connection terminal 14 of the antenna cable 13. The test terminal 22 has a fixed contact 31 and a movable contact 32. A wiring pattern 33 provided on the circuit board 19 electrically connects the fixed contact 31 to the contact 30 of the antenna connector 21. The movable contact 32 can move from an ON position (see FIG. 7A) to an OFF position (FIG. 7B), and vice versa. At the ON position, the movable contact 32 contacts the fixed contact 31. At the OFF position, it no longer contacts the fixed contact 31. A wiring pattern 34 provided on the circuit board 19 electrically connects the movable contact 32 to the RF circuit 23. In this case, the connector 21 and terminal 22 are connected While the movable contact 32 remains in contact with the fixed contact 31, the connector 21 and terminal 22 are connected in series to the RF circuit 23 that is provided on the circuit board 19.

Figure 7A:
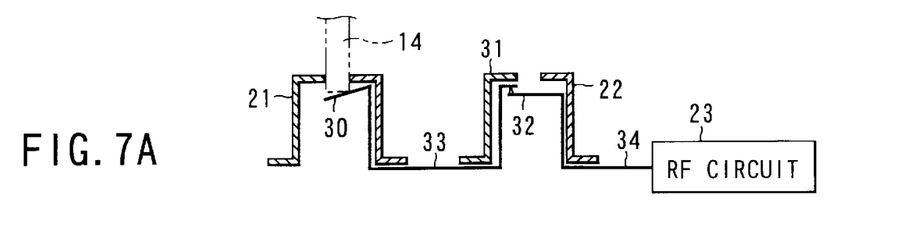
FIG. 7A is a diagram illustrating the electrical connection between the antenna connector, test terminal and RF circuit, all provided in the portable computer.
Figure 7B:
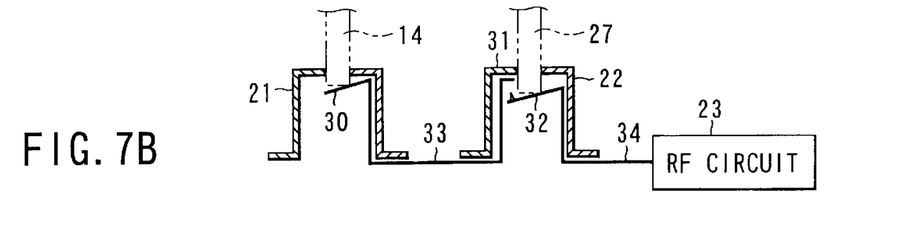
FIG. 7B is a diagram showing the antenna connector that is electrically disconnected from the RF circuit while the test probe remains connected to the test terminal.

The movable contact 32 moves from the ON position to the OFF position as shown in FIG. 7B, when the test probe 27 is connected to the test terminal 22. As a result, the test probe 27 is electrically connected to the RF circuit 23. At the same time, the antenna cable 13 is electrically disconnected from the RF circuit 23.

Figures 4A, 4B:
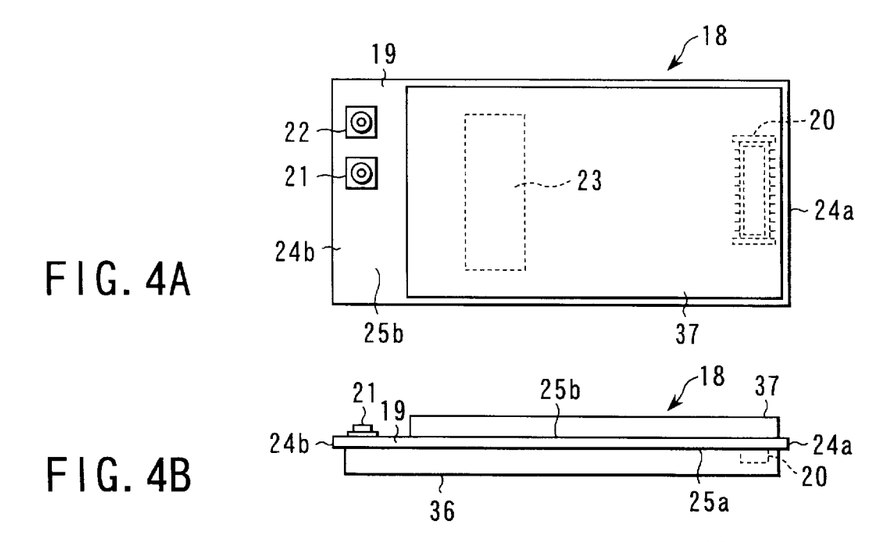
FIG. 4A is a plan view of the radio communications module, seen from the second surface of the circuit board.
FIG. 4B is a side view of the radio communications module.
Figure 4C:
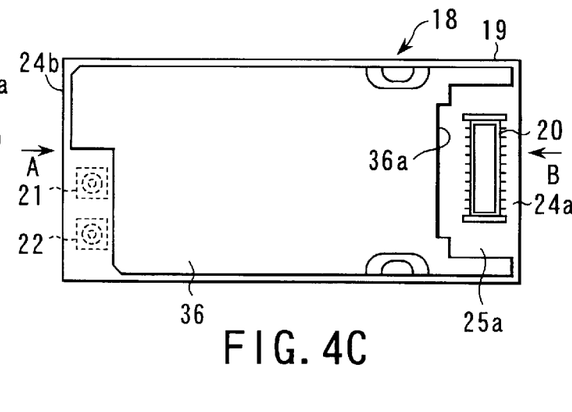
FIG. 4C is a plan view of the radio communications module, seen from the first surface of the circuit board.
Figure 4D:
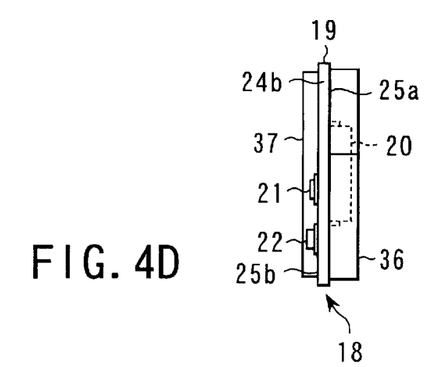
FIG. 4D is an end-view of the radio communications module, seen from the direction of arrow A shown in FIG. 4C.
Figure 4E:
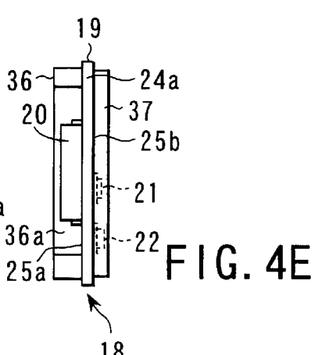
FIG. 4E is the other end-view of the radio communications module, seen in the direction of arrow B shown in FIG. 4C.

The radio communications module 18 includes two shields 36 and 37. The first shield 36 covers the first surface 25a of the circuit board 19, thus protecting the board 19 from electromagnetic waves. As FIG. 4C shows, the first shield 36 has a notch 36a at one end. Through the notch 36a, the interface connector 20 is exposed on the first surface 25a of the circuit board 19. The second shield 37 covers the second surface 25b of the circuit board 19, thus protecting the board 19 from electromagnetic waves. However, the second shield 37 does not cover the antenna connector 21 or the test terminal 22. Hence, the connector 21 and the terminal 22 are exposed on the second surface 25b of the circuit board 19.

Figure 6:
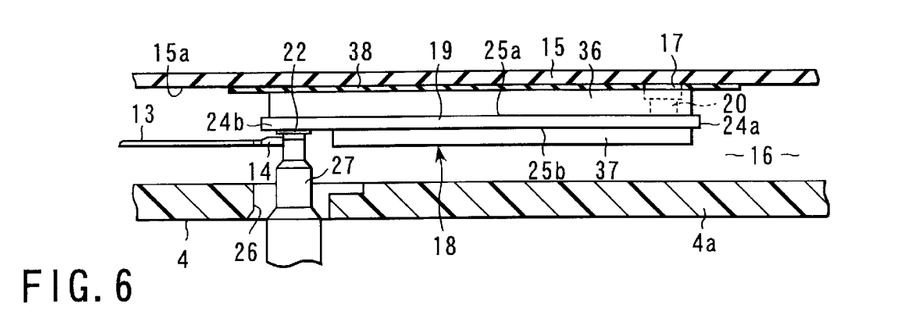
FIG. 6 is a sectional view of the portable computer, showing a test probe connected to the test terminal of the radio communications module.

As FIGS. 5 and 6 show, an electrically insulating sheet 38 covers the mounting region 15a of the system board 15. The insulating sheet 38 contacts, in its entirely, the upper surface of the first shield 36 as long as the radio communications module 18 remains connected to the system board 15. In other words, the insulating sheet 38 is clamped between the radio communications module 18 and the mounting region 15a of the system board 15. There is no space at all, between the mounting region 15a and the radio communications module 18.

The sequence of determining the RF characteristics of the radio communications module 18 will be explained.

First, the housing 4 is turned upside down, thereby exposing the bottom wall 4a as shown in FIG. 3. The plug 28 is pulled from the through hole 26 made in the bottom wall 4a. As shown in FIG. 6, the text probe 27 is inserted into the housing 4 via the hole 26 until it pushes the movable contact 32 of the test terminal 22, moving the contact 32 from the fixed contact 31 thereof. The antenna connector 21 is thereby electrically disconnected from the RF circuit 23. At the same time, the test probe 27 is electrically connected to the RF circuit 23 as is illustrated in FIG. 7B. The test probe 27 can determine the RF characteristics of the radio communications module 18, with the module 18 kept connected to the system board 15.

The test terminal 22 of the module 18, to which the test probe 27 may be connected, is located away from the interface connector 20 and faces the through hole 26 of the bottom wall 4a. Thanks to this, the test terminal 22 would not lie between the system board 15 and the circuit board 19.

Hence, the test terminal 22 can electrically connect the test probe 27 to the RF circuit 23, when the test probe 27 is only inserted into the housing 4 through the hole 26 made in the bottom wall 4a of the housing 4. The test probe 27 can, therefore, determine the RF characteristics of the radio communications module 18, without removing the module 18 from the system board 15 or decomposing the housing 4. This makes it possible to determine the RF characteristics of the module 18, with high efficiency.

Moreover, the RF characteristics of the radio communications module 18 can be determined with high reliability. This is because the module 18 need not be removed from the housing 4 to have its RF characteristics determined.

As FIGS. 5 and 6 show, the upper surface of the first shield 36 contacts the entire insulating sheet 38 covering the mounting region 15a of the system board 15, as long as the radio communications module 18 remains connected to the system board 15. The system board 15 therefore supports the entire module 18, from the side facing away from the test terminal 22. The system board 15 withstands the force that is applied to the module 18 when the test probe 27 is pushed onto the test terminal 22 and connected thereto.

In other words, no excessive load exerts on the node of the connector receptacle 17 and interface connector 20, though the interface connector 20 and the test terminal 22 are spaced from each other in the lengthwise direction of the circuit board 19. This helps to prevent damages to the connector receptacle 17 and the interface connector 20. The RF characteristics of the radio communications module 18 can be determined in safety.

In addition, the antenna connector 21 is located adjacent to the test terminal 22 and would not slip into the interface between the system board 15 and the circuit board 19. The connection terminal 14 of the antenna cable 13 can therefore be connected to the antenna connector 21, without the necessity of removing the module 18 from the system board 15. Thus, the antenna cable 13 can be laid and arranged with ease.

The present invention is not limited to the first embodiment. The second embodiment of the invention will be described, with reference to FIG. 8 and FIGS. 9A to 9E.

A radio communications module 41 according to the second embodiment is the same as the first embodiment, except that the antenna connector 21 arranged on the first surface 25a of the circuit board 19. The components that are identical or similar to those of the first embodiment are designated at the same reference numerals and will not be described in detail.

As FIGS. 9A to 9E illustrate, the antenna connector 21 is provided on the edge part 24b of the circuit board 19 and spaced far from the test terminal 22 provided on the first edge part 24a of the board 19. While the radio communications module 41 remains connected to the system board 15, the antenna connector 21 faces the system board 15 and the node of the connector 21 and connection terminal 14 lies between the system board 15 and the circuit board 19. Further, the first shield 36 that covers the first surface 25a of the circuit board 19 has a notch 42. On account of the notch 42, the antenna connector 21 is exposed.

Figure 8:
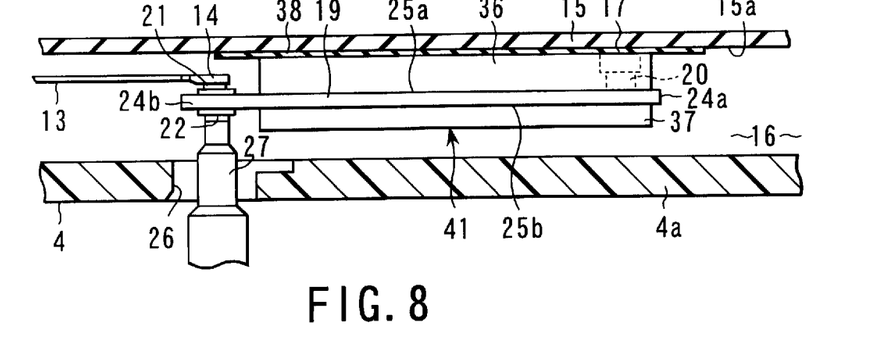
FIG. 8 is a sectional view of a portable computer according to the second embodiment of the invention, showing a test probe connected to the test terminal of the radio communications module.
Figures 9A, 9B:
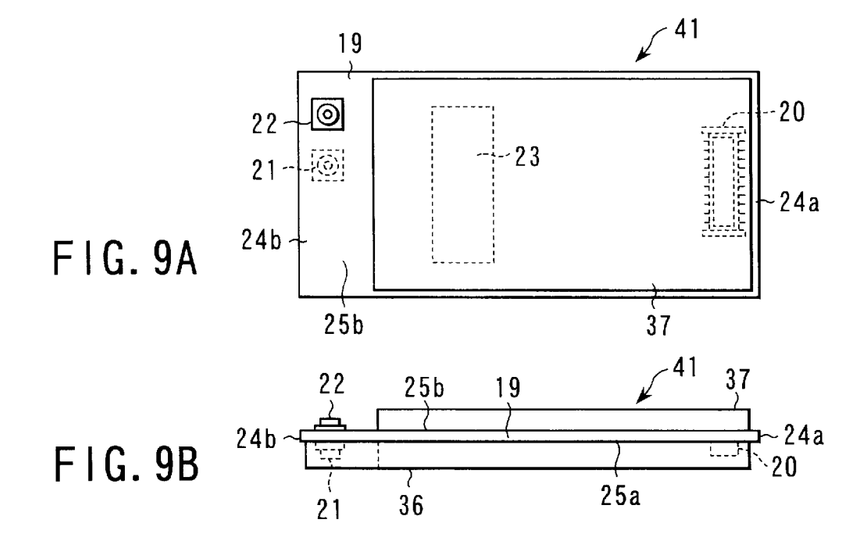
FIG. 9A is a plan view of the radio communications module, seen from the second surface of the circuit board.
FIG. 9B is a side view of the radio communications module.
Figure 9C:
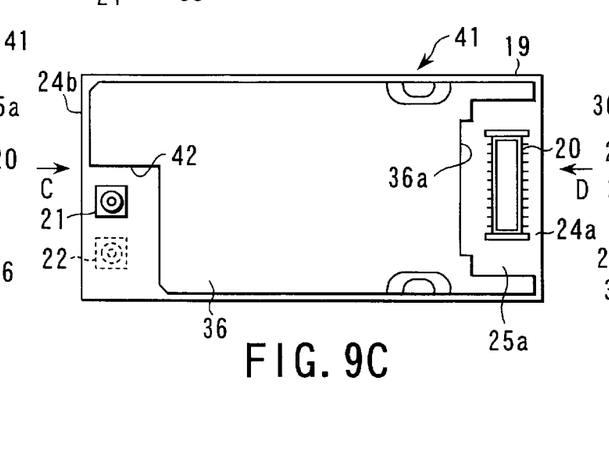
FIG. 9C is a plan view of the radio communications module, seen from the first surface of the circuit board.
Figure 9D:
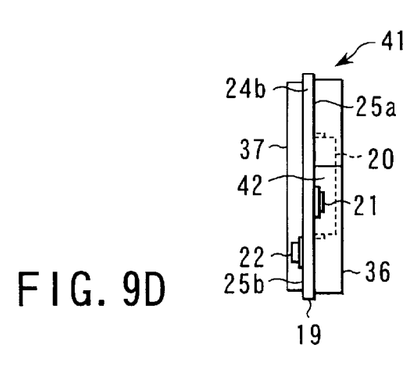
FIG. 9D is an end-view of the radio communications module, seen from the direction of arrow C shown in FIG. 9C.
Figure 9E:
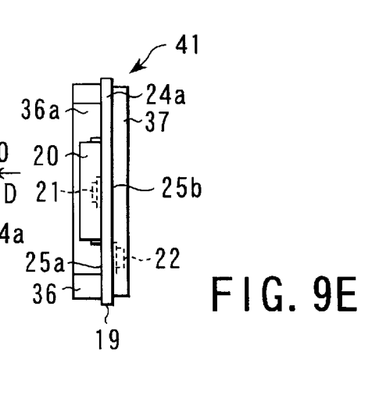
FIG. 9E is the other end-view of the radio communications module, seen in the direction of arrow D shown in FIG. 9C.

In the radio communications module 41, the test terminal 22 on the circuit board 19 opposes the through hole 26 made in the bottom wall 4a of the housing 4. Thanks to this, the test terminal 22 can electrically connect the test probe 27 to the RF circuit 23, when the test probe 27 is only inserted into the housing 4 through the hole 26. The test probe 27 can, therefore, determine the RF characteristics of the radio communications module 41, without removing the module 41 from the system board 15 or decomposing the housing 4.

FIG. 10, FIG. 11 and FIGS. 12A to 12D illustrate a radio communications module 51 that is the third embodiment of the present invention.

Figure 10:
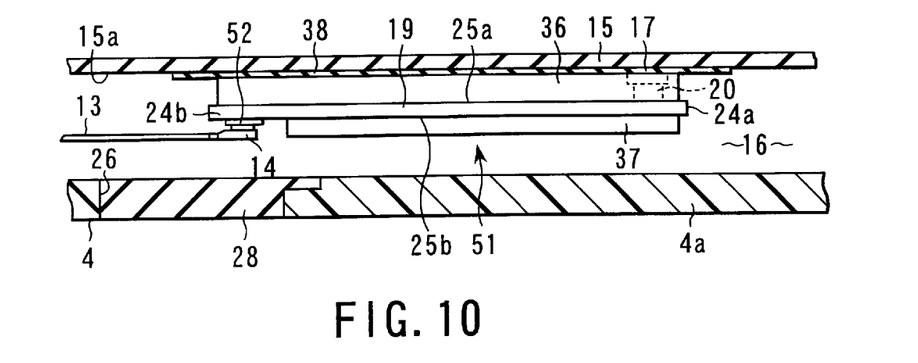
FIG. 10 is a sectional view of a portable computer according to the third embodiment of the invention, illustrating the positional relation between the bottom wall of the housing and the radio communications module mounted on the system board.
Figure 11:
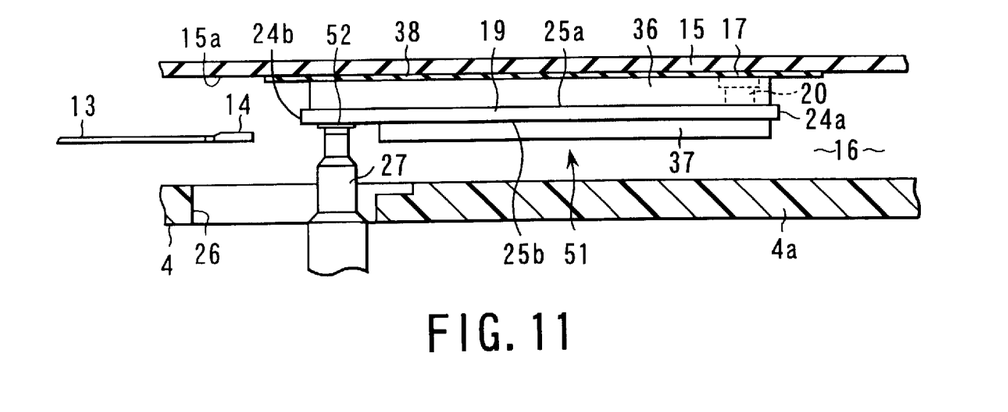
FIG. 11 is a sectional view of the portable computer, showing a test probe connected to the test terminal of the radio communications module.
Figure 12A:
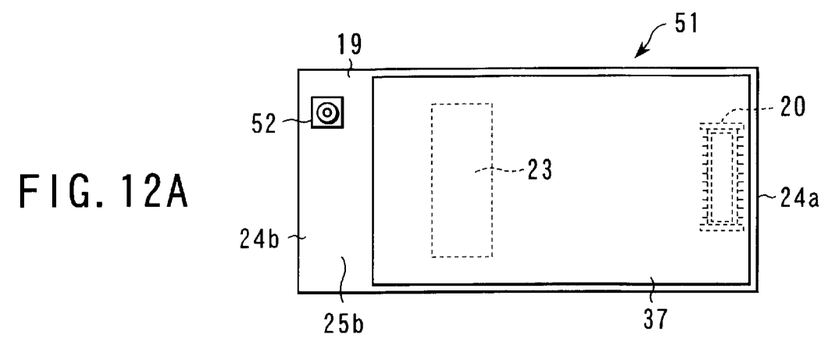
FIG. 12A is a plan view of the radio communications module, seen from the second surface of the circuit board.
Figure 12B:
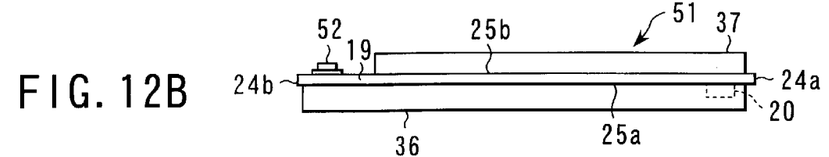
FIG. 12B is a side view of the radio communications module.
Figure 12C:
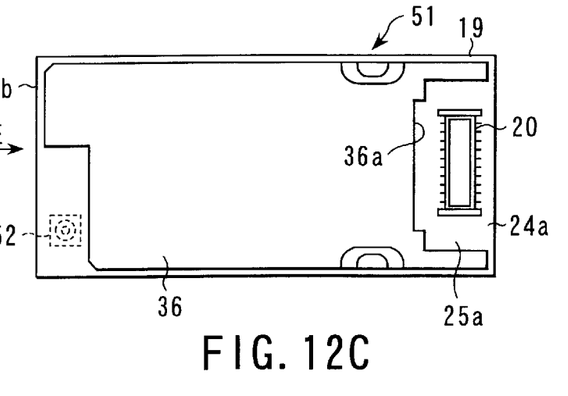
FIG. 12C is a plan view of the radio communications module, seen from the first surface of the circuit board.
Figure 12D:
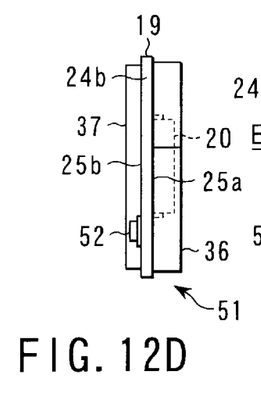
FIG. 12D is an end-view of the radio communications module, seen from the direction of arrow E shown in FIG. 12C.

In the radio communications module 51, a single connector 52 is arranged on the second surface 25b of the circuit board 19. To one end of the connector 52, either the connection terminal 14 of the antenna cable 13 or the test terminal 27 can be removably connected. The other end of the connector 52 is electrically connected to the RF circuit 23 mounted on the circuit board 19. The connector 52 is provided on the second edge part 24b of the circuit board 19. It is spaced from the interface connector 20 in the lengthwise direction of the circuit board 19. Hence, the connector 52 opposes the through hole 26 of the bottom wall 4a as long as the radio communications module 51 remains connected to the system board 15 as is illustrated in FIGS. 10 and 11.

During the normal use of the radio communications module 51, the connection terminal 14 of the antenna cable 13 remains connected to the connector 52 of the module 51. To determine the RF characteristics of the module 51, the following sequence of steps is carried out. First, the connector terminal 14 is disconnected from the connector 52, thereby nullifying the electrical connection between the antenna element 12 and the RF circuit 23. Then, the test probe 27 is inserted into the housing 4 through the hole 26 of the bottom wall 4a. Finally, the test probe 27 is pushed onto the connection terminal 14. The probe 27 is thereby electrically connected to the RF circuit 23. The test probe 27 can then determine the RF characteristics of the radio communications module 51, while the module 51 remains connected to the system board 15.

After the RF characteristics of the module 51 are determined, the test probe 27 is pulled out of the housing 4 through the hole 26 and the connection terminal 14 of the antenna cable 13 is connected to the connector 52. Finally, the plug 28 is fitted into the hole 26, closing the hole 26.

In the radio communications module 51, the connector 52 mounted on the second edge part 24b of the circuit board 19 is spaced far from the interface connector 20 that is provided on the first edge part 24a of the board 19. The connector 52 would not lie between the system board 15 and the circuit board 19. Thus, it is possible to push the test probe 27 onto the connector 52 and to connect and disconnect the connection terminal 14 to and from the connector 52, without removing the radio communications module 51 from the system board 15.

FIG. 13, FIGS. 14A to 14E, and FIGS. 15A and 15B show a radio communications module 61 according to the fourth embodiment of this invention.

Figure 13:
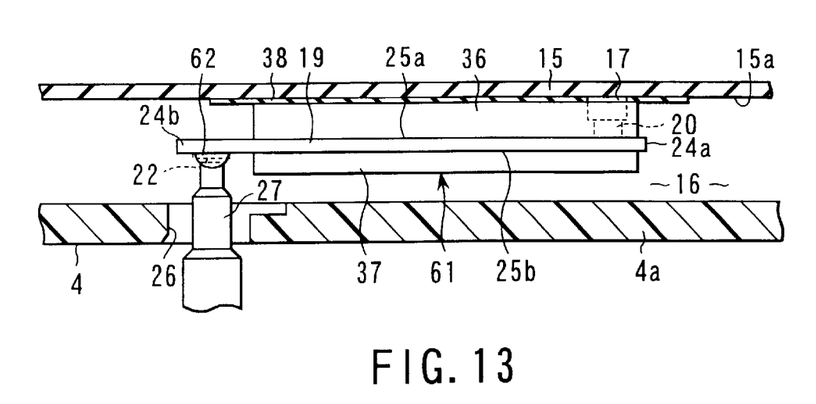
FIG. 13 is a sectional view of a portable computer according to the fourth embodiment of the invention, showing a test probe connected to the test terminal of the radio communications module.
Figure 14A:
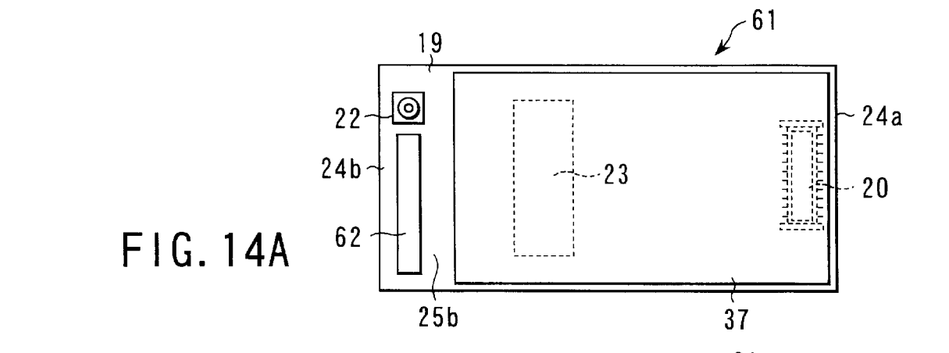
FIG. 14A is a plan view of the radio communications module, seen from the second surface of the circuit board.
Figures 14B, 14C, 14D, 14E:
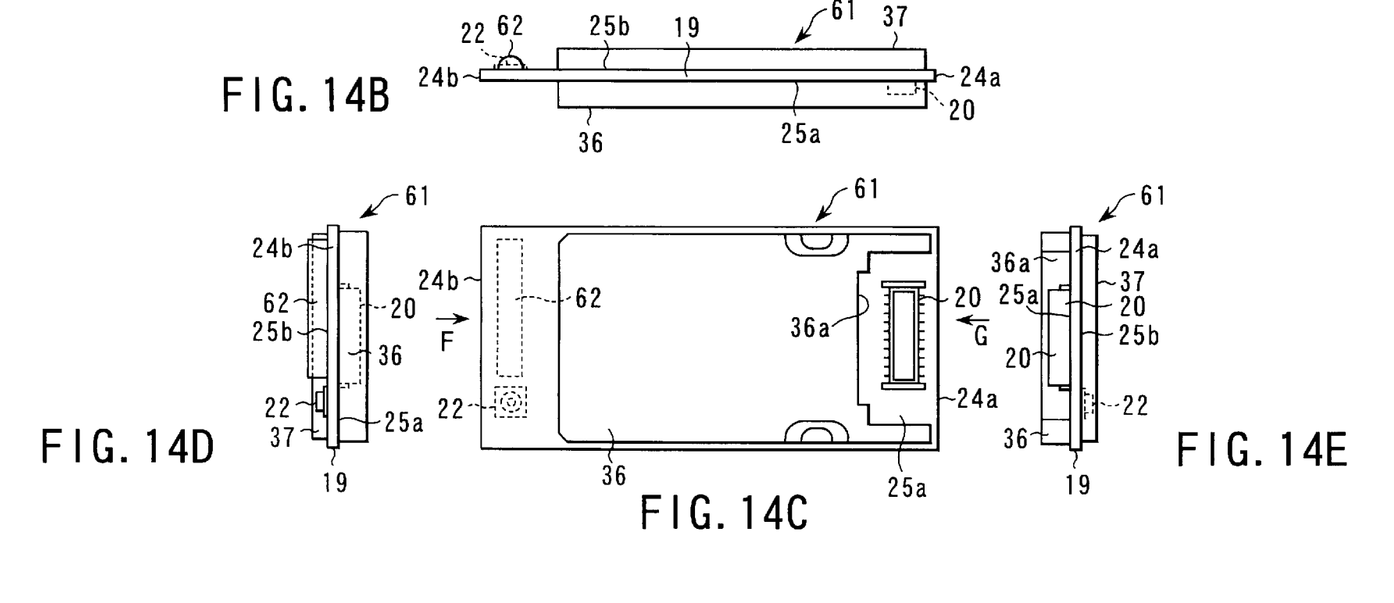
FIG. 14B is a side view of the radio communications module.
FIG. 14C is a plan view of the radio communications module, seen from the first surface of the circuit board.
FIG. 14D is an end-view of the radio communications module, seen from the direction of arrow F shown in FIG. 14C.
FIG. 14E is the other end-view of the radio communications module, seen in the direction of arrow G shown in FIG. 14C.

This radio communications module 61 incorporates an antenna element 62. The antenna element 62 is provided on the second surface 25b of the circuit board 19 and located at the second edge part 24b of the circuit board 19. A test terminal 22 is arranged on the second surface 25b of the board 19 and besides the antenna element 62. The test terminal 22 and the antenna element 62 are spaced far from the interface connector 20 that is provided on the first edge part 24a of the circuit board 19. Therefore, the test terminal 22 faces the through hole 26 made in the bottom wall 4a, as long as the radio communications module 61 remains connected to the system board 15 as is illustrated in FIG. 13.

Figure 15A:
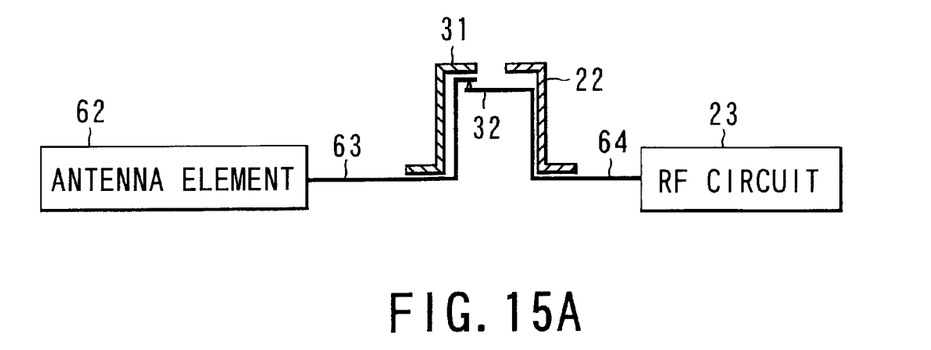
FIG. 15A is a diagram illustrating the electrical connection between the antenna connector, test terminal and RF circuit, all provided in the portable computer.
Figure 15B:
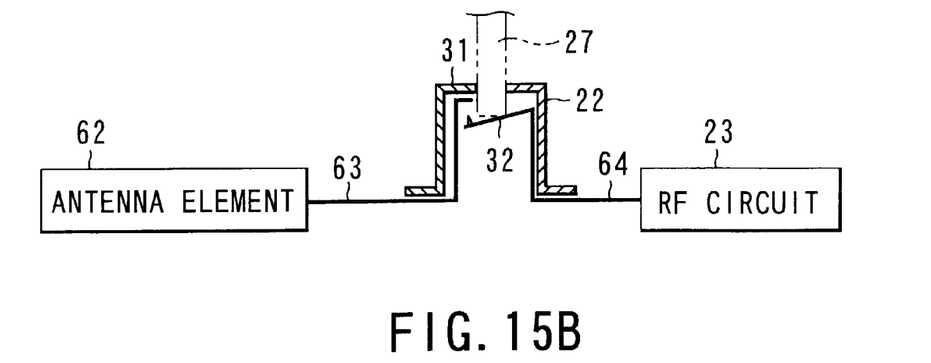
FIG. 15B is a diagram showing the antenna connector that is electrically disconnected from the RF circuit while the test probe remains connected to the test terminal.

As FIGS. 15A and 15B show, the test terminal 22 has a fixed contact 31 and a movable contact 32, and two wiring patterns 63 and 64 are provided on the circuit board 19. The wiring pattern 63 electrically connects the fixed contact 31 to the antenna element 62. The wiring pattern 64 connects the movable contact 32 to the RF circuit 23. The movable contact 32 moves from an ON position to the OFF position as shown in FIG. 15B, when the test probe 27 is connected to the test terminal 22. The test probe 27 is thereby electrically connected to the RF circuit 23. At the same time, the antenna element 62 is electrically disconnected from the RF circuit 23.

In the radio communications module 61, the test terminal 22 faces the through hole 26 of the bottom wall 4a while the module 61 remains connected to the system board 15. On account of this, the test terminal 22 can electrically connect the test probe 27 to the RF circuit 23, when the test probe 27 is only inserted into the housing 4 through the hole 26. The test probe 27 can, therefore, determine the RF characteristics of the radio communications module 61, without removing the module 61 from the system board 15 or decomposing the housing 4.

In the fourth embodiment, the antenna element 62 is provided on the second surface 25b of the circuit board 19. Instead, the antenna element 62 may be mounted on the first surface 25a of the circuit board 19. If so, the element 62 is interposed between the circuit board 19 and the system board 15.

In the present invention, the hole through which the test probe inserted into and pulled from the housing may be made in a member other than the bottom wall of the housing. The hole may be made in the top wall of the housing.

Furthermore, the electronic apparatus according to the present invention is not limited to a portable computer. It may be any other portable information tool, such as a PDA (Personal Digital Assistant).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communications module to be electrically connected to a system board incorporated in an electronic apparatus, said module comprising:
    a circuit board which processes radio signals and which has a first surface and a second surface opposite to the first surface, said first surface opposing the system board;
    a connection section which is arranged on the first surface of the circuit board and which is to be electrically connected to the system board;
    an antenna connector which is arranged on the second surface of the circuit board and to which an antenna cable extending from an antenna element for achieving radio communication is to be electrically connected; and
    a test terminal which is arranged on the second surface of the circuit board so as to measure a characteristic of the circuit board.

2. The radio communications module according to claim 1, wherein the circuit board includes an RF circuit, and the antenna connector and test terminal are electrically connected to the RF circuit.

3. The radio communications module according to claim 2, wherein the antenna connector is electrically disconnected from the RF circuit when a test probe is connected to the test terminal.

4. The radio communications module according to claim 1, wherein the circuit board is rectangular and includes a first edge part and a second edge part which are spaced apart in a lengthwise direction, the connection section is located at the first edge part, and the antenna connector and test terminal are located at the second edge part.

5. The radio communications module according to claim 1, which further comprises a first shield member which covers the first surface of the circuit board and a second shield member which covers the second surface of the circuit board, and in which the connection section lies outside the first shield member and is exposed at the first surface, and the antenna connector and the test terminal lies outside the second shield member and are exposed at the second surface.

6. The radio communications module according to claim 5, wherein the first shielding member overlaps the system board.

7. A radio communications module to be electrically connected to a system board incorporated in an electronic apparatus, said module comprising:
    a circuit board which processes radio signals and which has a first surface and a second surface opposite to the first surface, said first surface opposing the system board;
    a connection section which is arranged on the first surface of the circuit board and which is to be electrically connected to the system board; and
    a connector which is arranged on the second surface of the circuit board and to which one of an antenna cable extending from an antenna element for achieving radio communication and a test probe is to be connected removably.

8. The radio communications module according to claim 7, wherein the circuit board includes an RF circuit, and the connector is electrically connected to the RF circuit.

9. The radio communications module according to claim 7, wherein the circuit board is rectangular and includes a first edge part and a second edge part which are spaced apart in a lengthwise direction, the connection section is located at the first edge part, and the connector is located at the second edge part.

10. The radio communications module according to claim 7, which further comprises a first shield member which covers the first surface of the circuit board and a second shield member which covers the second surface of the circuit board, and in which the connection section lies outside the first shield member and is exposed at the first surface, and the connector lies outside the second shield member and is exposed at the second surface.

11. An electronic apparatus comprising:
    a housing;
    a system board which is incorporated in the housing and having a mounting surface; and
    a radio communications module mounted on the mounting surface of the system board, said radio communications module including:
        a circuit board which processes radio signals and which has a first surface and a second surface opposite to the first surface, said first surface opposing the system board;

a connection section which is arranged on the first surface of the circuit board and which is to be electrically connected to the system board;

an antenna connector which is arranged on one of the first surface and the second surface of the circuit board and to which an antenna cable extending from an antenna element for achieving radio communication is to be electrically connected; and a test terminal which is arranged on the second surface of the circuit board so as to measure a characteristic of the circuit board.

12. The electronic apparatus according to claim 11, wherein the circuit board includes an RF circuit, and the antenna connector and the test terminal are electrically connected to the RF circuit.

13. The electronic apparatus according to claim 11, wherein the radio communications module overlaps the mounting surface of the system board.

14. The electronic apparatus according to claim 11, wherein the housing has an outer wall which opposes the second surface of the circuit board, and the outer wall has a through hole which is aligned with the test terminal and through which a test probe is removably inserted into the housing.

15. An electronic apparatus comprising:

a housing which has an outer wall having a through hole;

a system board which is incorporated in the housing and which has a mounting surface that opposes the outer wall;

a radio communications module which is mounted on the mounting surface of the system board, said module including:

a circuit board which processes radio signals and which has a first surface and a second surface, said first surface opposing the mounting surface, and said second surface being opposite to the first surface and opposing the outer wall;

a connection section which is arranged on the first surface of the circuit board and which is to be electrically connected to the system board;

an antenna connector which is arranged on one of the first surface and second surface of the circuit board and to which an antenna cable extending from an antenna element for achieving radio communication is to be electrically connected; and a test terminal which is arranged on the second surface of the circuit board, which is aligned with the through hole of the outer wall and to which a test probe inserted into the housing via the through hole is to be connected removably.

* * * * *